United States Patent Office 3,260,647
Patented July 12, 1966

3,260,647
PARASITICIDAL AND ANTHELMINTIC
COMPOSITIONS AND METHODS
Guy H. Harris, Concord, and Bryant C. Fischback, Walnut Creek, Calif., and Patricia I. Traylor, Cambridge, Mass., assignors to The Dow Chemical Company, Midland, Mich., a corporation of Delaware
No Drawing. Filed May 2, 1962, Ser. No. 192,013
10 Claims. (Cl. 167—53)

This is a continuation-in-part of our copending application Serial No. 770,580, filed October 30, 1958, and now abandoned.

This invention is directed to compounds corresponding to the formula and to methods and formulations wherein they are employed for the control of pests.

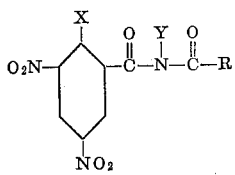

In this and succeeding formulae, X represents hydrogen, methoxy, methyl or ethyl, Y represents hydrogen, methyl or ethyl and R represents alkoxy. The expression "alkoxy" is employed in the present specification and claims to refer to radicals containing from 1 to 12 carbon atoms, inclusive. These new compounds are crystalline solids which are somewhat soluble in many organic solvents and of very low solubility in water. They have been found to be useful as parasiticides and are adapted to be employed as active toxic constituents of compositions for the control of a number of helminth, insect, fungal and protozoan organisms such as Southern army worms, *Alternaria solani*, *Eimeria tenella* and *Eimeria necatrix*.

The new compounds can be prepared by mixing or otherwise blending together an acid halide corresponding to the formula

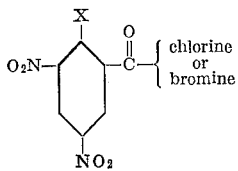

with an alkyl carbamate corresponding to the formula

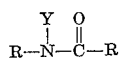

The reaction is carried out at a temperature at which halide of reaction is formed from the halogen in the acid halide reactant. This halide appears in the reaction mixture as hydrogen halide. The reaction can be carried out in an organic solvent as reaction medium such as dioxane and in the presence of a hydrogen halide acceptor such as pyridine. The reacticon proceeds smoothly at temperatures of from 30° up to 250° C. with the production of the desired product and hydrogen halide of reaction. In carrying out the reaction, substantially all of the halide in the acid halide reagent may be recovered as hydrogen halide. Upon completion of the reaction, the desired product can be separated by conventional methods such as filtration, decantation, washing with water and evaporation of any employed reaction solvent.

The following examples merely illustrate the invention and are not to be construed as limiting.

*Example 1.*—Methyl (3,5-dinitro-o-toluoyl)carbamate

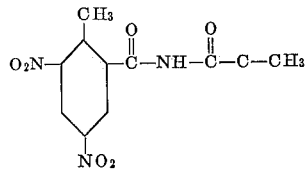

3,5-dinitro-o-toluoyl chloride (20 grams; 0.082 mole) and 8.2 grams (0.11 mole) of methyl carbamate were mixed together and heated at gradually increasing temperatures up to a temperature of 190° C. The heating was accompanied by the evolution of hydrogen chloride of reaction, the evolution being substantially complete toward the end of the heating period. The reaction mixture was then cooled to room temperature. During the cooling, the mixture solidified and the solidified product was thereafter successively recrystallized from toluene and ethanol. As a result of these operations, there was obtained a methyl (3,5-dinitro-o-toluoyl)carbamate product melting at 192°–195° C. and having a carbon content of 42.10 percent as compared with a theoretical content of 42.41 percent.

*Example 2.*—Ethyl (3,5-dinitro-o-toluoyl)carbamate 3,5-dinitro-o-toluoyl chloride (44.1 grams; 0.18 mole) was dispersed in 100 milliliters of dioxane and the resulting mixture was added to 44.6 grams (0.5 mole) of ethyl carbamate dissolved in 200 milliliters of dioxane. The resulting mixture was then heated for 2.5 hours at the boiling temperature and under reflux. Toward the end of the heating period, the evolution of hydrogen chloride of reaction was substantially complete. The solvent was then removed from the reaction mixture by evaporation to obtain an ethyl (3,5-dinitro-o-toluoyl)carbamate product as a crystalline residue. This product was recrystallized from ethanol and found to melt at 162–164° C. and have a carbon content of 44.3 percent as compared to a theoretical content of 44.45 percent.

*Example 3.*—n-Butyl (3,5-dinitiro-o-toluoyl)carbamate 3,5-dinitro-o-toluoyl chloride (24.5 grams; 0.1 mole) and 12.9 grams (0.11 mole) of n-butyl carbamate were mixed together and the resulting mixture heated at gradually increasing temperatures up to a temperature of 220° C. and until the evolution of hydrogen chloride of reaction was substantially complete. The reaction mixture was then recrystallized from toluene to obtain a n-butyl (3,5-dinitro-o-toluoyl)carbamate product melting at 163°–165° C. and having a carbon content of 48.21 percent as compared with a theoretical content of 48.03 percent.

*Example 4.*—2-ethylhexyl (3,5-dinitro-o-toluoyl) carbamate 3,5-dinitro-o-toluoyl chloride (24.5 grams; 0.1 mole) and 18.8 grams (0.11 mole) of 2-ethylhexyl carbamate were mixed together and heated at gradually increasing temperatures up to a temperature of 230° C. and until the evolution of hydrogen chloride of reaction was substantially complete. The reaction mixture was then recrystallized from toluene to obtain a 2-ethylhexyl (3,5-dinitro-o-toluoyl)carbamate product melting at 136.6°–137.2° C.

In a similar manner, other products may be prepared of which the following are representative:

Isopropyl (3,5-dinitro-o-toluoyl)ethylcarbamate by reacting 3,5-dinitro-o-toluoyl bromide with isopropyl ethylcarbamate.

Dodecyl (3,5-dinitro-2-methoxybenzoyl)carbamate by reacting 3,5-dinitro-2-methoxybenzoyl chloride with dodecylcarbamate.

Octyl (3,5-dinitrobenzoyl)methylcarbamate by reacting 3,5-dinitrobenzoyl chloride with octyl methylcarbamate.

Decyl (3,5-dinitro-2-methoxybenzoyl)carbamate by reacting 3,5-dinitro-2-methoxybenzoyl chloride with decylcarbamate.

Methyl (3,5-dinitro-2-ethylbenzoyl)ethylcarbamate by reacting 3,5-dinitro-2-ethylbenzoyl chloride with methyl ethylcarbamate.

Amyl (3,5-dinitrobenzoyl)methylcarbamate by reacting 3,5-dinitrobenzoyl chloride with amyl methylcarbamate.

The compounds of the present invention have been found to be useful as parasiticides and as anthelminitics for the control of gastro-intestinal parasites in warm-blooded animals. The administration or feeding of an effective dosage of the compounds is essential and critical for the practice of the present invention. In general, good results are obtained when the animals are fed a daily dosage of from 10 to 2,000 milligrams of the carbamate compounds per kilogram of body weight. Where prophylactic treatment for the control of gastro-intestinal parasites is desired and the compounds are fed continuously, daily oral dosages of from 10 to 250 milligrams per kilogram of body weight have been found to be satisfactory.

The method of the present invention can be carried out by the oral administration or feeding of the unmodified carbamate compounds. However, the present invention also embraces the employment of liquid, mash, powder, pellet or other animal feed compositions containing said compounds. In such usage, the compounds are modified with one or more of a plurality of additaments or innocuous ingestible adjuvants including water, ethanol, skimmed milk, syrup, edible oils, surface active dispersing agents such as the liquid and solid emulsifying agents and edible solid carriers such as edible powders and commercial animal feeds, concentrates and supplements. By commercial animal feeds, concentrates or supplements are meant the partial or complete animal feeds containing desirable amounts of minerals, vitamins, antioxidants, antibiotics and growth stimulants. In these modified compositions, the adjuvant cooperates with the active ingredient so as to facilitate the invention and obtain an improved result. Such compositions are adapted to be fed to animals to supply the desired dosage of active agent or to be employed as concentrates and subsequently diluted with additional carrier to produce the ultimate compositions. The exact concentration of the carbamate compounds to be employed in the compositions may vary provided that enough of the composition is ingested by the animal so as to provide the required dosage of active ingredient. For example, where direct administration to the individual animal is preferred, liquid or solid compositions containing from 5 to 98 percent by weight of the agents are employed to supply the desired dosage. Where the compounds are provided as a constituent of the principal food ration, satisfactory results are obtained with rations containing a minor but effective amount of the carbamate compounds. The exact amount of the compounds in the ration is dependent upon food consumption and feeding habits of the animal concerned. In fowl, the required dosage is supplied with mash compositions containing from 0.003 to 0.1 percent by weight of the carbamate agents. In representative operations, the feeding of commercial poultry mash compositions containing 0.01 percent by weight of the carbamate compounds is found to give substantially complete controls of coccidiosis in chickens resulting from *Eimeria tenella*. In pigs, the required dosage may be supplied with mash compositions containing these same concentrations of active agent when fed as the principal food ration.

Liquid compositions containing the desired amount of the carbamate compounds can be prepared by dissolving the compounds in ethanol, propylene glycol or an edible oil or by dispersing them in water with the aid of a suitable surface active dispersing agent such as an ionic or non-ionic emulsifying agent. Suitable surface active dispersing agents include the glycerol and sorbitan esters of fatty acids and the polyoxyalkylene derivatives of fatty alcohols and of sorbitan esters. The aqueous compositions may contain one or more water-immiscible oils as a solvent for the active agent. In such compositions, the water, oil and emulsifying agent constitute an aqueous emulsion carrier.

In the preparation of solid feed compositions, the carbamate compounds can be mechanically ground with an edible solid such as oyster shell flour or a solid surface active dispersing agent such as finely divided bentonite or fuller's earth. These compositions can be administered in the form of capsules or tablets or dispersed in animal feed and such feed used to supply a part or all of the ration.

In representative operations, various carbamate compounds were dispersed in commercial poultry mash to produce feed compositions containing 0.05 percent by weight of one of the compounds. These compositions and unmodified mash were fed as sole feed rations to flocks of chickens of the same history and past environment which were from 10 to 12 days of age. One day following the initiation of the diets, about 30,000 sporulated *Eimeria necatrix* oocysts were introduced directly into the crops of the birds. Another flock of birds was left untreated and uninoculated to serve as an uninfected check.

Following the inoculation, the birds were examined every day for evidence of coccidial disease and on the seventh day, the birds sacrificed, autopsied and an examination made to determine the percent control of coccidiosis. The compounds employed and results of the observations are set forth in the following table:

| Test Compound | Percent Control of Coccidiosis |
| --- | --- |
| Methyl (3,5-dinitro-o-toluoyl)carbamate | 100. |
| Ethyl (3,5-dinitro-o-toluoyl)carbamate | 100. |
| n-Butyl (3,5-dinitro-o-toluoyl)carbamate | 100. |
| 2-Ethylhexyl (3,5-dinitro-o-toluoyl)carbamate | 100. |
| Infected check | All birds heavily infected with coccidial disease. |
| Uninfected check | No coccidial disease. |

The 3,5-dinitrobenzoyl halides and 3,5-dinitro-2-alkylbenzoyl halides employed as starting materials in accordance with the teachings of the present invention may be prepared by reacting a suitable 3,5-dinitro-2-arenoic acid with thionyl chloride ($SOCl_2$), thionyl bromide or phosphorus pentachloride to produce the corresponding and desired acid halide. The 3,5-dinitrio-2-methoxybenzoyl halides employed as starting materials may be prepared by reacting an alkali metal methoxide with an alkali metal salt of 3,5-dinitro-2-chlorobenzoic acid whereby a methoxy group is substituted for chlorine to produce an alkali metal salt of 3,5-dinitro-2-methoxybenzoic acid. The salt is then converted to the corresponding acid and thereafter reacted with thionyl halide to produce the desired starting material.

What is claimed is:

1. A method useful for the prophylaxis and treatment of animals against gastro-intestinal parasites which comprises orally administering to animals susceptible to said parasites a compound having the formula

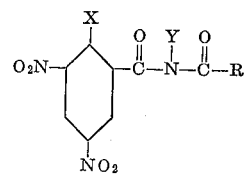

wherein X represents a member of the group consisting of hydrogen, methoxy, methyl and ethyl, Y represents a member of the group consisting of hydrogen, methyl and ethyl and R represents alkoxy containing from 1 to 12 carbon atoms, inclusive, said compound being employed daily in the amount of 10 to 2,000 milligrams per kilogram of body weight.

2. A method claimed in claim 1 wherein the carbamate is methyl (3,5-dinitro-o-toluoyl)carbamate.

3. A method claimed in claim 1 wherein the carbamate is ethyl (3,5-dinitro-o-toluoyl)carbamate.

4. A method claimed in claim 1 wherein the carbamate is n-butyl (3,5-dinitro-o-toluoyl)carbamate.

5. A method claimed in claim 1 wherein the carbamate is 2-ethylhexyl (3,5-dinitro-o-toluoyl)carbamate.

6. A concentrate composition useful for the prophylaxis and treatment of animals against gastro-intestinal parasites comprising from 5 to 98 percent by weight of a compound having the formula

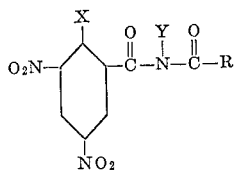

wherein X represents a member of the group consisting of hydrogen, methoxy, methyl and ethyl, Y represents a member of the group consisting of hydrogen, methyl and ethyl and R represents alkoxy containing from 1 to 12 carbon atoms, inclusive, in intimate admixture with an edible, finely divided solid.

7. An animal feed useful for the prophylaxis and treatment of animals against gastro-intestinal parasites containing from 0.003 to 0.1 percent by weight of a compound corresponding to the formula

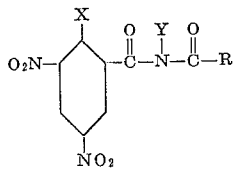

wherein X represents a member of the group consisting of hydrogen, methoxy, methyl and ethyl, Y represents a member of the group consisting of hydrogen, methyl and ethyl and R represents alkoxy containing from 1 to 12 carbon atoms, inclusive.

8. A poultry feed containing from 0.003 to 0.1 percent by weight of methyl (3,5-dinitro-o-toluoyl)carbamate.

9. A poultry feed containing from 0.003 to 0.1 percent by weight of ethyl (3,5-dinitro-o-toluoyl)carbamate.

10. A poultry feed containing from 0.003 to 0.1 percent by weight of butyl (3,5-dinitro-o-toluoyl)carbamate.

References Cited by the Examiner

UNITED STATES PATENTS

| | | | |
|---|---|---|---|
| 2,755,285 | 7/1956 | O'Neill | 260—306.8 |
| 2,829,084 | 4/1958 | O'Neill | 167—53.1 |
| 3,129,246 | 4/1964 | Harris | 260—552 |

OTHER REFERENCES

Elsmore, J. Chem. Soc., London, Part 4, pp. 4458–4463, 1956.

FRANK CACCIAPAGLIA, JR., *Primary Examiner.*

MORRIS O. WOLK, *Examiner.*